US009554048B2

(12) United States Patent
Silverstein

(10) Patent No.: US 9,554,048 B2
(45) Date of Patent: Jan. 24, 2017

(54) IN-STREAM ROLLING SHUTTER COMPENSATION

(71) Applicant: Apple Inc., Cupertino, CA (US)

(72) Inventor: D. Amnon Silverstein, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 127 days.

(21) Appl. No.: 14/038,309

(22) Filed: Sep. 26, 2013

(65) Prior Publication Data

US 2015/0085150 A1    Mar. 26, 2015

(51) Int. Cl.
*H04N 5/232* (2006.01)
*H04N 5/353* (2011.01)
*H04N 5/14* (2006.01)

(52) U.S. Cl.
CPC ............ *H04N 5/2329* (2013.01); *H04N 5/145* (2013.01); *H04N 5/23229* (2013.01); *H04N 5/23248* (2013.01); *H04N 5/23254* (2013.01); *H04N 5/23277* (2013.01); *H04N 5/3532* (2013.01); *H04N 5/23258* (2013.01); *H04N 5/23261* (2013.01)

(58) Field of Classification Search
CPC .. H04N 5/2329; H04N 5/145; H04N 5/23277; H04N 5/23254; H04N 5/23248; H04N 5/3532; H04N 5/23229; H04N 5/23261; H04N 5/23258; G06T 7/20; G06T 5/001; G06T 2207/10141; G06T 2207/10004
See application file for complete search history.

(56) References Cited

U.S. PATENT DOCUMENTS 6,809,758 B1    10/2004    Jones
8,054,335 B2    11/2011    Deng et al.
(Continued)

FOREIGN PATENT DOCUMENTS

TW    201127028    8/2011
TW    201304527    1/2013

OTHER PUBLICATIONS

International Search Report and Written Opinion from PCT/US2014/051792, issued Oct. 23, 2014, Apple Inc., pp. 1-9.
(Continued)

*Primary Examiner* — Aung S Moe
(74) *Attorney, Agent, or Firm* — Robert C. Kowert; Meyertons, Hood, Kivlin, Kowert & Goetzel, P.C.

(57) ABSTRACT

In-stream rolling shutter compensation may be utilized to modify image data to compensate for detected camera motion. An image processor may perform motion matching on image data received from a camera sensor to determine whether and how the camera is moving. Strips of image data are analyzed to find matching locations between the current image and a previous image by generating graphical profiles for each image strip. The graphical profiles for the current strip are compared to corresponding profiles from the previous image to determine matching locations between the two frames. A motion vector for the strip may be computed based on spatial distances between the match locations of the current image and corresponding match locations of the previous frame. Image data for the current strip may be modified based on the motion vector to compensate for perceived camera motion as it is written out to memory.

20 Claims, 9 Drawing Sheets

(56) References Cited

U.S. PATENT DOCUMENTS

| | | | |
|---|---|---|---|
| 8,107,750 B2 * | 1/2012 | Spampinato et al. | 382/236 |
| 8,179,446 B2 | 5/2012 | Hong et al. | |
| 8,350,922 B2 | 1/2013 | D'Angelo et al. | |
| 8,358,359 B2 | 1/2013 | Baker et al. | |
| 9,025,885 B2 * | 5/2015 | Alpert et al. | 382/197 |
| 2001/0010680 A1 * | 8/2001 | Kikuchi et al. | 369/291 |
| 2003/0030744 A1 * | 2/2003 | Baer | 348/370 |
| 2006/0140602 A1 * | 6/2006 | Kurata et al. | 396/55 |
| 2006/0170784 A1 * | 8/2006 | Clarke et al. | 348/208.99 |
| 2007/0147706 A1 * | 6/2007 | Sasaki et al. | 382/295 |
| 2007/0297026 A1 * | 12/2007 | John | 358/486 |
| 2008/0030587 A1 * | 2/2008 | Helbing | 348/208.4 |
| 2009/0066800 A1 * | 3/2009 | Wei | 348/208.99 |
| 2009/0160957 A1 * | 6/2009 | Deng et al. | 348/208.99 |
| 2009/0201383 A1 * | 8/2009 | Slavin | 348/222.1 |
| 2010/0073535 A1 * | 3/2010 | Huggett et al. | 348/297 |
| 2010/0309340 A1 | 12/2010 | Border et al. | |
| 2011/0085049 A1 * | 4/2011 | Dolgin | H04N 5/23248 348/208.4 |
| 2011/0176014 A1 * | 7/2011 | Hong et al. | 348/208.4 |
| 2011/0176043 A1 * | 7/2011 | Baker et al. | 348/296 |
| 2011/0267514 A1 | 11/2011 | D'Angelo et al. | |
| 2012/0307084 A1 * | 12/2012 | Mantzel | H04N 5/23248 348/208.2 |
| 2012/0307085 A1 * | 12/2012 | Mantzel et al. | 348/208.4 |
| 2013/0044230 A1 * | 2/2013 | Zhou | 348/208.6 |
| 2013/0044241 A1 * | 2/2013 | Zhou | 348/241 |
| 2013/0070121 A1 * | 3/2013 | Gu et al. | 348/239 |
| 2013/0128121 A1 * | 5/2013 | Agarwala et al. | 348/607 |
| 2013/0141580 A1 * | 6/2013 | Stein et al. | 348/148 |
| 2013/0265460 A1 * | 10/2013 | Wu et al. | 348/222.1 |
| 2013/0314557 A1 * | 11/2013 | Furukawa | H04N 5/225 348/208.1 |
| 2013/0329064 A1 * | 12/2013 | Price et al. | 348/208.6 |
| 2013/0335606 A1 * | 12/2013 | Aoki et al. | 348/296 |
| 2014/0028876 A1 * | 1/2014 | Mills | H04N 5/77 348/231.99 |
| 2014/0071299 A1 * | 3/2014 | Grundmann et al. | 348/207.1 |
| 2014/0078327 A1 * | 3/2014 | Miyasako | 348/208.6 |
| 2014/0153840 A1 * | 6/2014 | Chiao et al. | 382/255 |
| 2014/0160309 A1 * | 6/2014 | Karpenko | 348/208.6 |
| 2014/0226033 A1 * | 8/2014 | Sendik | 348/208.1 |
| 2014/0363044 A1 * | 12/2014 | Williams et al. | 382/103 |
| 2015/0085150 A1 * | 3/2015 | Silverstein | 348/208.6 |
| 2016/0037073 A1 * | 2/2016 | Mills | H04N 5/23258 348/208.2 |

OTHER PUBLICATIONS

Office Action from Taiwan Patent Application No. 103129595, Date Jan. 12, 2016 (English Translation and Taiwan Version), Apple Inc., pp. 1-11.

* cited by examiner

300

310

320

IN-STREAM ROLLING SHUTTER COMPENSATION

BACKGROUND

Modern digital cameras, such as complementary metal-oxide-semiconductor (CMOS) cameras, frequently employ a method of image acquisition in which each frame is recorded by scanning across the frame row by row from top to bottom (or column by column across the frame) rather than by taking a single snapshot of the entire scene at a single point in time. Thus, not all parts of the image may be recorded at the same time. This method of image acquisition is sometimes called rolling shutter, because the shutter is moving (e.g., rolling) across the image area of the scene.

Due to the rolling shutter, visual distortions may be introduced and may be visually apparent when the entire image is displayed. In general, any movement of the camera as the image is captured may result in a warping or distortion of the image. Images captured using rolling shutter acquisition may exhibit different types of visual effects or distortions. One type of distortion may be caused by the camera not being held completely still throughout the entire process of scanning a frame. If the camera is moving horizontally, the image gets sheared. If the camera moves vertically, image is stretched or compressed.

For example, in images captured while a camera is vibrating, such when used from a moving vehicle, a wobble distortion may be created. Video exhibiting this distortion may appear to wobble unnaturally in a jelly-like fashion. Similarly, if a camera moves from side to side, a skew distortion may result in which the image may bend diagonally in one direction or another. If a CMOS camera sensor is used to take an image of a moving object, different areas of the object may appear smeared or to change proportion as compared to other areas of the object.

SUMMARY

In-stream rolling shutter compensation may be utilized to modify image data as it is received from a camera sensor to compensate for detected camera motion. When performing in-stream rolling shutter compensation, an image processor may perform motion matching on image data coming through a camera sensor to determine whether the camera is moving and how the camera is moving (e.g., the direction of motion). As the image data is received, the current image may be analyzed in strips to find matching locations between the current image (e.g., frame) and a previous image. Matches between the two frames may be found by comparing graphical profiles containing summed row and column pixel data for each image strip. For example, luminance data for each pixel in a column (of the current strip) may be combined together (e.g., summed, averaged, etc.) to compute a column graphical profile while luminance data for pixels in a row may be combined to compute a row graphical profile.

The horizontal and vertical graphical profiles may be compared to corresponding data from the previous image to determine matching locations between the two frames. A motion vector for the strip may be determined based on the spatial distance between pairs of matching locations (e.g., between the current and previous frames) and may represent camera motion between the two frames. As the image data is written out (e.g., to memory) the current image data may be adjusted (e.g., warped) to compensate for the perceived camera motion based on the computed motion vector.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
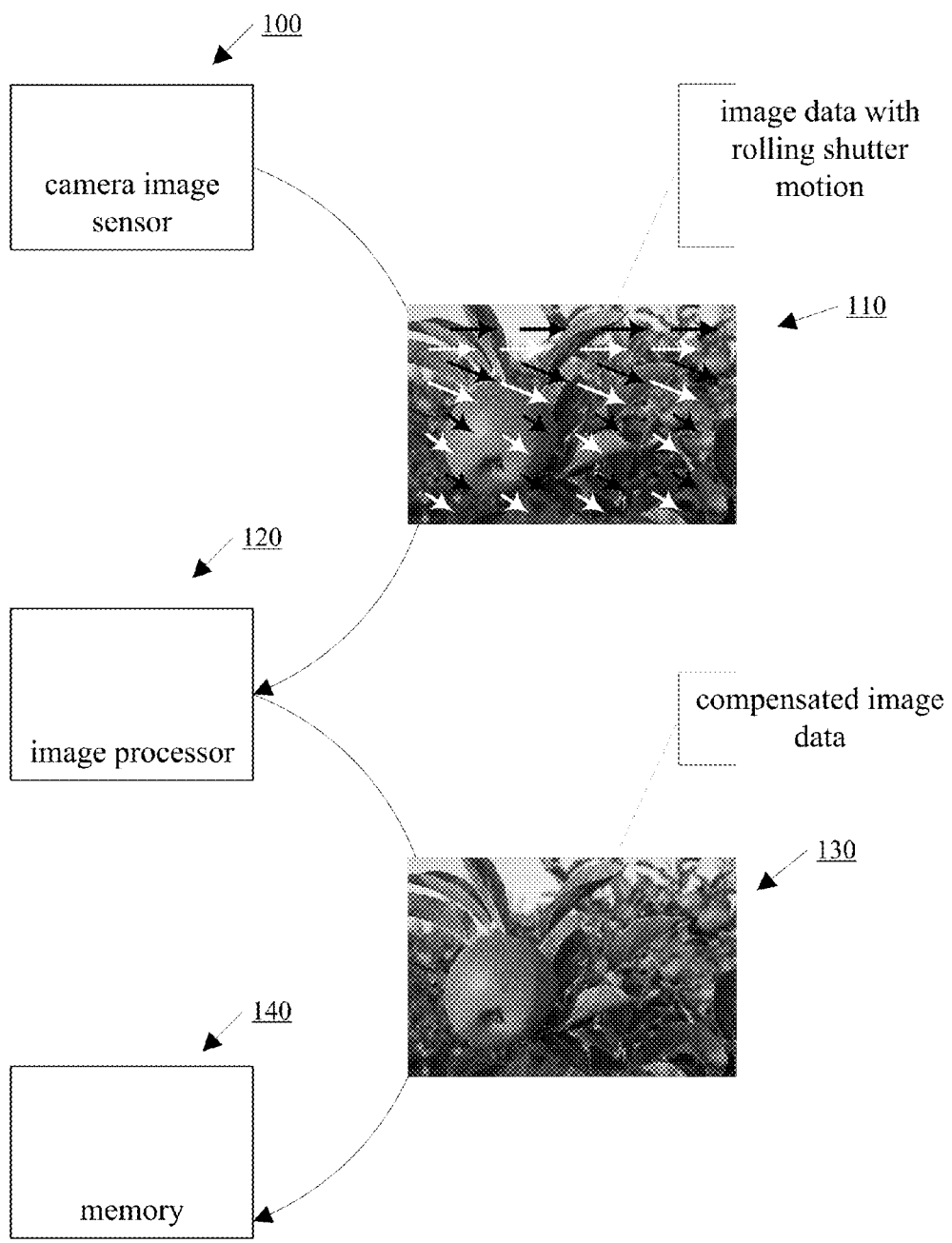
FIG. 1 is a logical block diagram illustrating in-stream rolling shutter compensation, according to one embodiment.

In-stream rolling shutter compensation may be applied to image data to compensate for camera motion by warping the image data while the image data is received from the image sensor, according to some embodiments. Turning now to FIG. 1, which is a logical block diagram illustrating one embodiment of in-stream rolling shutter compensation. When performing in-stream rolling shutter compensation, an image processor may perform motion matching between current image data and previous image data to determine whether the camera is moving and how the camera is moving (e.g., the direction and extent of motion). For example, image data 110 of FIG. 1 includes arrows representing the direction of example camera motion. Please note that the arrows within image data 110 are merely exemplary and do not represent any particular or actual camera motion.

In one embodiment, image processor 120 may perform motion matching between image data 110 received from camera image sensor 100 and previous image data. Camera image sensor 100 illustrated in FIG. 1 may represent any of various sorts of image sensors, according to various embodiments. For example, in one embodiment, camera image sensor 100 may represent a CMOS based image sensor. In other embodiments, in-stream rolling shutter compensation may be utilized with image data from sources other than an image sensor. For example, image processor 120 may perform in-stream rolling shutter compensation on image data that was previously captured and stored to memory (or other buffer), storage (e.g., disk drive, CD ROM, etc.), or to another storage mechanism, according to different embodiments. In some embodiments, image processor 120 may receive image data from a camera image sensor, but the image data may also be transferred though one or more other devices/components between the image sensor and the image processor. For example, image processor 120 may receive the image data from a buffer or system memory into which the camera sensor stores the image data as it is captured.

Additionally, image processor 120 may perform in-stream rolling shutter compensation on image data loaded from a remote source, such as over a local or wide area network, or the internet. Thus, while described herein in terms of image data received from a camera image sensor, in-stream rolling shutter compensation may be utilized with image data regardless of how that image data is received, stored and/or loaded, according to various embodiments.

Image processor 120 may generate graphical profiles for each image (e.g., current and previous) and may use those graphical profiles to compare the two images to determine one or more match locations from which a motion vector may be computed, as will be described in more detail below. Image processor 120 may then warp the image data 110 based on the computed motion vector to compensate for camera motion. The warped image data, such as compensated image data 130, may then be written out to memory 140, according to some embodiments. In some embodiments, the image data may be warped as it is written out to memory 140.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

An image processor utilizing in-stream rolling shutter compensation may not compare two full image frames (e.g., a complete current frame and a complete previous frame) in order to determine camera motion. For instance, many digital (or CMOS) cameras may not maintain full frame buffers and memory buffer constraints (e.g., timing/performance issues) may prevent the comparison of two full frames using frame buffers. Instead, image processor 120 may analyze an image as multiple image portions, as will be described in more detail below regarding FIG. 2.

Image processor 120, illustrated in FIG. 1, may represent any of various sorts of image processors or image processing units, which may be implemented in various manners. For instance, in one embodiment image processor 120 may represent an image processing unit implemented in hardware, while in another embodiment image processor 120 may represent an image processing unit implemented in software.

Figure 2:
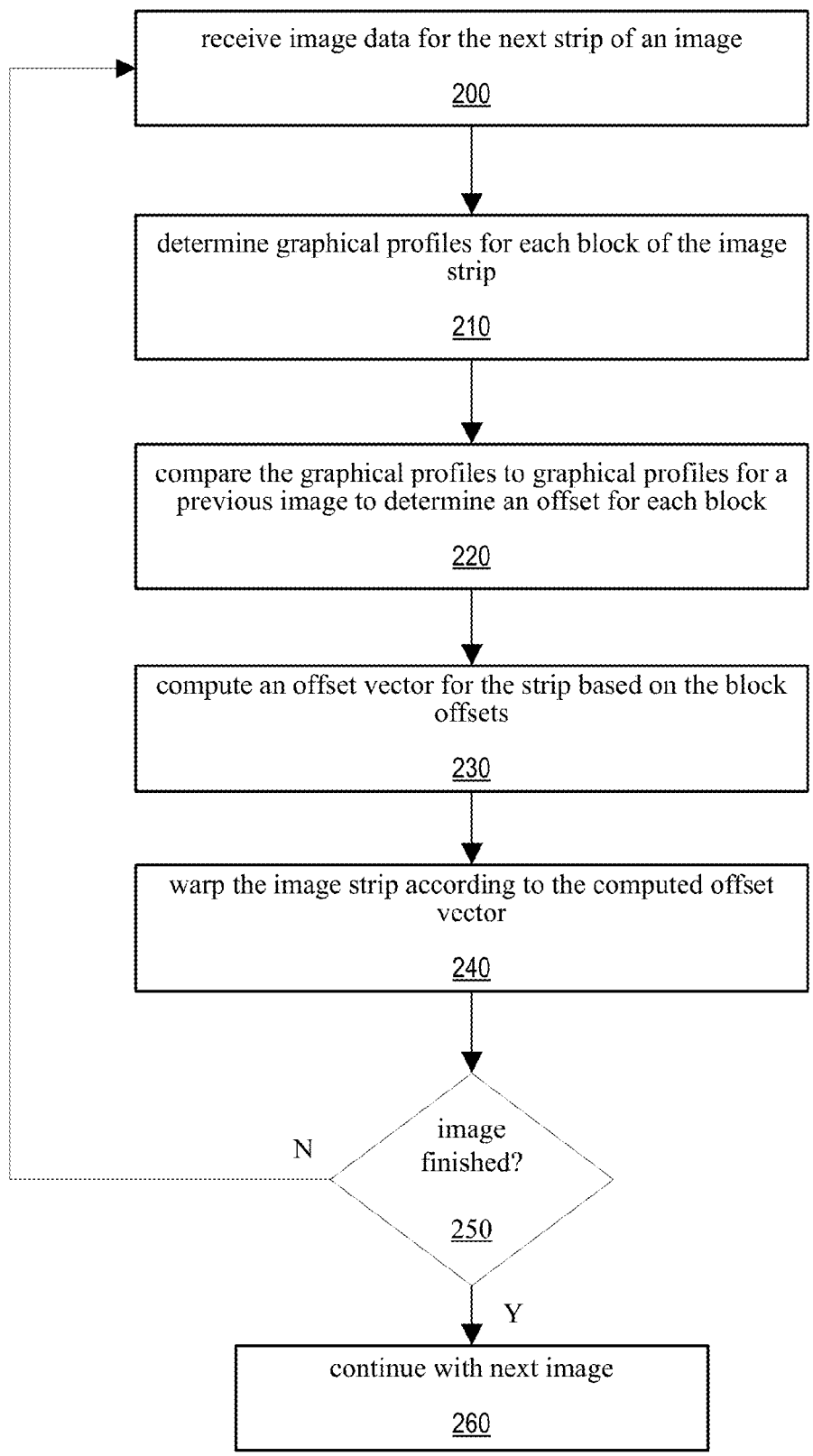
FIG. 2 is a flowchart illustrating one embodiment of a method for in-stream rolling shutter compensation, as described herein.

FIG. 2 is a flowchart illustrating one embodiment of a method for in-stream rolling shutter compensation, as described herein. Image processor 120 may perform in-stream rolling shutter compensation on an image by splitting the image into multiple image strips and by splitting the strip into multiple blocks, according to some embodiments. Thus, as illustrated in block 200 image processor 120 may receive image data (e.g., from image sensor 100) for the next strip of an image and may determine graphical profiles for each block of the image strip, as shown in block 210.

Image processor 120 may generate graphical profiles for each block based on any of various image characteristic or pixel values. For instance, in one embodiment, luminance values may be combined (e.g., summed or averaged) across a block in columns (of pixels) to generate a vertical graphical profile for the block. For example, image processor 120 may be configured to convert red/blue/green data for pixels into corresponding luminance values and the luminance values for all pixels in a column may be combined together to generate a vertical luminance profile and multiple column profiles may be combined to generate aggregate profiles, such as a vertical profile for the block.

Similarly, horizontal graphical profiles may be determined for an image block by combining image characteristics for each row in the strip. Thus, horizontal and vertical graphical profiles may be determined for each block of an image strip. In some embodiments, a single graphical profile may include both a horizontal component and a vertical component, but in other embodiments, horizontal and vertical graphical profiles (e.g., row and column profiles) may be determined separately.

While in some embodiments, image processor 120 may generate luminance based graphical profiles for each block, in other embodiments graphical profiles may be based on different image characteristics (e.g., different color spaces).

The exact number and size of blocks used by image processor 120 may vary from embodiment to embodiments. Additionally, in one embodiment, image processor 120 may not use individual blocks at all, but instead may determine a graphical profile for the entire strip. In some embodiments, the number of blocks may be predetermined, while in other embodiments, the size of each block may be predetermined. In yet other embodiments, the number and/or size of blocks may be determined by image processor 120 one an image by image basis.

As shown in block 220, image processor 120 may compare the graphical profiles to graphical profiles for a previous image to compute an offset for each block based on the block offsets, as illustrated in block 230. Graphical profiles for the current image strip may be compared to graphical profiles for corresponding strips of a previous image (such as a previous video frame) in order to determine match points between the two images from which camera motion may be computed, according to one embodiment. For example, luminance profiles for each block of a current strip may be compared to luminance profiles for similarly located blocks in a previous image to find matching locations between the two images, as will be described in more detail regarding FIG. 4.

In some embodiments, image processor 120 may be configured to determine a horizontal offset for a given block based on comparing a horizontal component of the block's graphical profile to graphical profiles for one or more blocks of the previous image. Similarly, image processor 120 may be configured to determine a vertical offset for a given block based on comparing a vertical component of the graphical profile to graphical profiles for one or more blocks of the previous image.

In some embodiments, the current and previous luminance profiles may be cross-correlated to locate luminance profile matches. Furthermore, in some embodiments, the spatial difference between the location of a match point in the current image and a corresponding match point in the previous image may be considered the offset for the block. The offsets of each match point for a block may be used to determine an offset vector for the block.

Additionally, image processor 120 may be configured to store, or otherwise retain, the graphical profiles for the current image for use when processing the next image. In general any suitable manner for storing and/or otherwise retaining the graphical profile information for future use may be used in conjunction with in-stream rolling shutter compensation.

As shown in block 240, image processor 120 may warp the image strip according to the computed offset vector, in one embodiment. For example, if the computed offset vector for a strip indicates motion to the right, the image data may be warped to the left to compensate for the perceived motion, according to one embodiment. The discussion of FIG. 8 below discusses the warping of image data to compensate for camera motion in more detail.

If image processor 120 has completed working on the final strip of the image, as shown by the positive output from decision block 250, image processor 120 may then proceed to begin in-stream rolling shutter compensation on another image as illustrated by block 260, such as to process the next image in a video stream. In some embodiments, image processor 120 may save or store the graphical profiles, block offsets and/or offset vectors generated while processing one image for use when processing the next image.

Instead, if image processor 120 has not finished processing the current image, as indicated by the negative output of decision block 250, image processor 120 may begin processing the next strip of image data for the image, such as by receiving image data for the next strip of an image, as shown by the path from the negative output of block 250 to block 200.

Figure 3:
FIG. 3 is a diagram illustrating an image undergoing in-stream rolling shutter compensation, according to one embodiment.
Figure 3:
Figure 3:
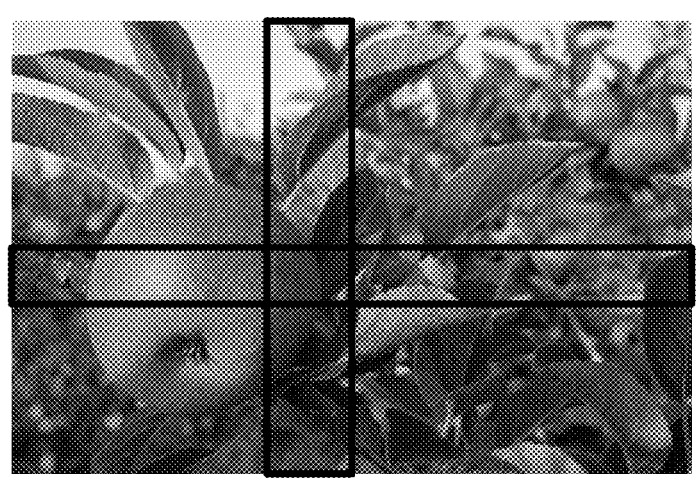

As noted above, in-stream rolling shutter compensation may be applied to image data to compensate for camera motion and image processor 120 may analyze image data for an image as a number of strips. FIG. 3 is a diagram illustrating image data analyzed as strips and blocks for in-stream rolling shutter compensation, according to one embodiment. Image data 300 illustrates an image divided into eight horizontal strips, according to one embodiment. Image data 310 illustrates the same image data divided into multiple vertical strips, according to one embodiment. For instance, while some image sensors may scan a scene using a series of horizontal scans, other camera sensors may scan a scene using a series of vertical scans. Thus, in some embodiments, image processor 120 may use horizon strips while in other embodiments, the image processor may use vertical strips when performing in-stream rolling shutter compensation, as described herein.

Additionally, as noted above, image processor 120 may divide each strip into multiple blocks and image data 320 illustrates one block for one strip of an image, according to one embodiment. The exact size and nature of the horizontal and vertical divisions use in in-stream rolling shutter compensation may vary from embodiment to embodiment.

Figure 4:
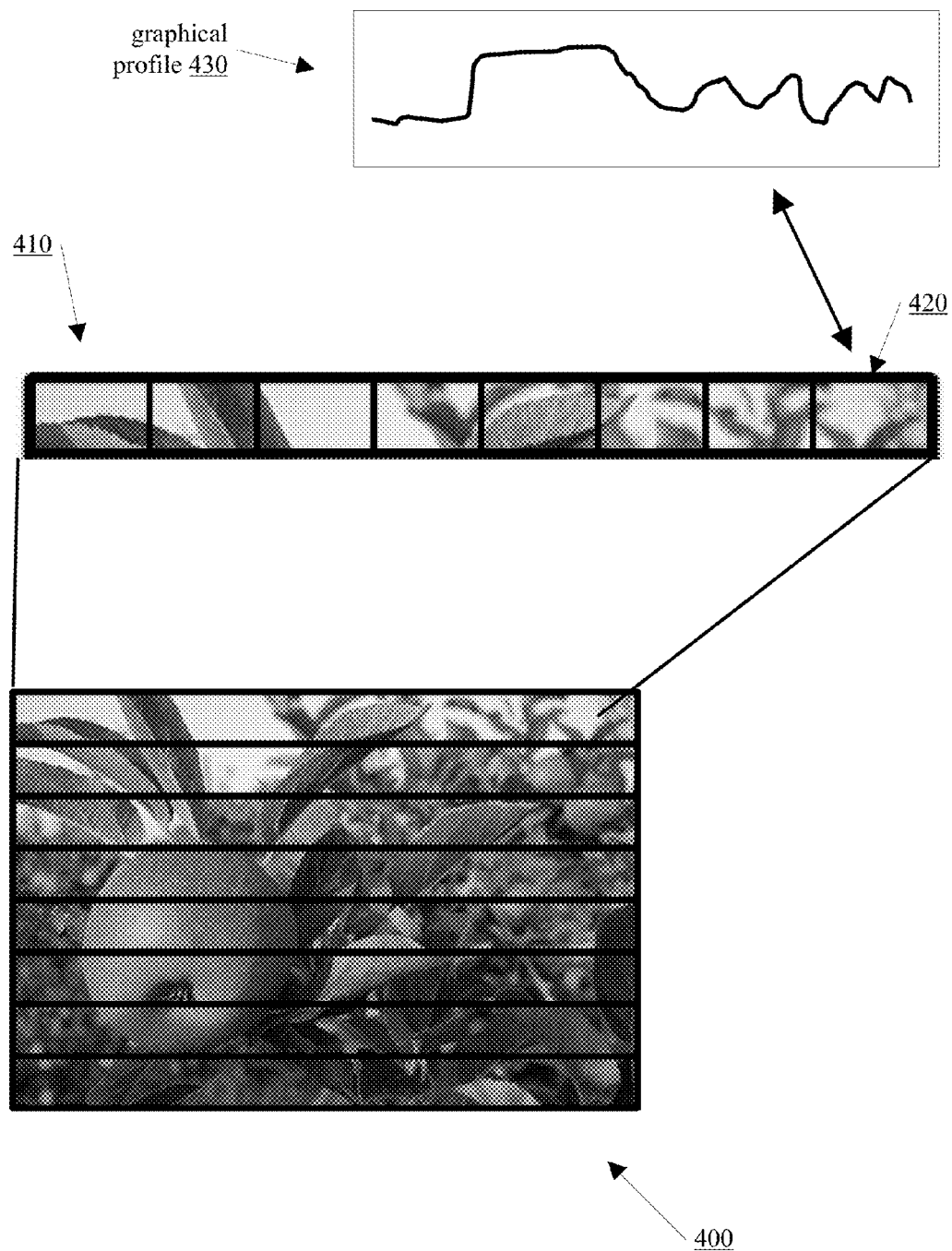
FIG. 4 is a diagram illustrating image strips and blocks according to one embodiment of in-stream rolling shutter compensation.

FIG. 4 is a diagram illustrating image strips and blocks according to one embodiment of in-stream rolling shutter compensation. As noted above regarding FIG. 3, an image may be divided into image strips and image blocks for analysis during in-stream rolling shutter compensation. Image data 400 illustrates an image divided into multiple horizontal strips and the top-most strip 410 is further illustrated divided into multiple blocks, such as block 420. When performing in-stream rolling shutter compensation, image processor 120 may analyze the image data for an image received from camera image sensor 100 image block by image block and image strip by image strip.

As noted above, image processor 120 may analyze the first image strip, such as strip 410, received from camera image sensor 100 prior to receiving the remaining strips. Thus, in-stream rolling shutter compensation may be performed as the image data is being captured by camera image sensor 100 (e.g., in real-time or near real-time). FIG. 4 also illustrates an example graphical profile 430 for image block 420. For instance, graphical profile 430 may represent a luminance column profile for image block 420, according to one embodiment. Thus, in the example illustrated in FIG. 4, graphical profile 430 may be illustrated as a data graph representing the combined luminance values across the columns of image block 420.

While illustrated in FIG. 4 as a data graph representing a luminance based profile as one example, graphical profiles may be computed, generated and/or stored in any of numerous manners, according to different embodiments.

Figure 5:
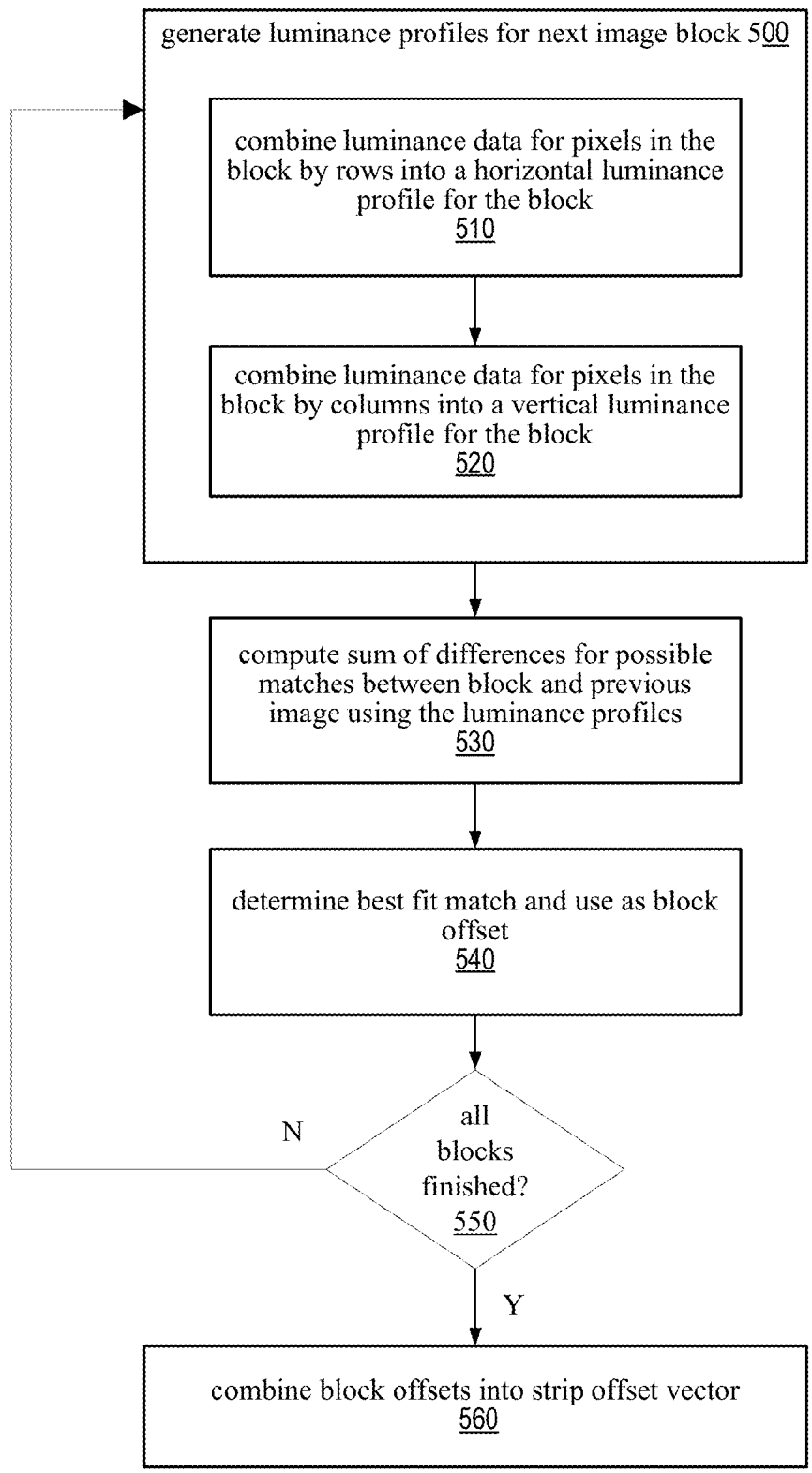
FIG. 5 is a flowchart illustrating one embodiment of a method for in-stream rolling shutter compensation, as described herein.

FIG. 5 is a flowchart illustrating one embodiment of a method for in-stream rolling shutter compensation, as described herein. As shown in block 500, image processor 120 may generate graphical profiles for the next image block, such as image block 420, in a strip 410, according to one embodiment. As noted above, image processor 120 may generate graphical profiles for each image block of an image strip based on luminance data for the pixels in the image block. Thus, as shown in block 510, image processor 120 may combine luminance data for pixels in the image block by rows into a horizontal luminance profile for the image block and may also combine luminance data for pixels in the image block by columns into a vertical luminance profile for the image block, as illustrated by block 520.

Luminance data (or other graphical information) for pixels in the image block may be combined in any of various manners in order to generate graphical profiles, according to different embodiments. For example, in one embodiment, luminance values for the pixels in a row (or column) may be averaged to together to generate a graphical profile, while in other embodiments, the luminance values may be added together to generate a graphical profile. Additionally, in some embodiments, one or more filters may be applied to the data when generating graphical profiles. For example, when generating a luminance based graphical profile, a highpass filter may be used. The use of such filters may aid the finding of profile matches, as discussed below.

As noted previously, the spatial offset between two matching luminance profile locations (one in the current image and one in the previous image) may represent camera motion between the two images. The luminance profiles may be compared to identify similar locations within each image (e.g., the current and previous) in order to determine the camera motion between the two images.

Thus, as shown in block 530, image processor 120 may compute the sum of differences for possible matches between the current image block and corresponding image blocks of a previous image using the graphical profiles and may determine a best fit match and use the best fit match as a block offset, as shown in block 540. For example, by comparing the sum of differences for multiple (or all) possible matches between the current block and corresponding blocks of the previous image, potential matches locations may be found between the two images. Locations in each image that have similar graphical profiles may be considered matches or potential matches for the two images.

Luminance profile matches (or potential matches) may be determined using 2 one-dimensional matches, rather than using 1 two-dimensional match, in some embodiments. For example, using 2 one-dimensional matches may result in lower computational requirements than a single two-dimensional match. In other words, for each block, a horizontal (e.g., left/right) match and a vertical (e.g., up/down) match may be found separately (e.g., 2 one-dimensional matches).

In order to find matches, the luminance profile for a current block may be compared to luminance profiles for several blocks for corresponding locations (and nearby locations) from the previous image or frame. Any potential matches may be categorized and compared to other potential matches in order to determine a best fit, is possible. For instance, the sum of absolute differences for a potential match may be used to categorize the potential match. If the sum of absolute differences for a match is small, the match may be considered a good fit. If the sum of absolute differences for a potential match is small, but the sum of absolute differences for other areas around the potential match (e.g., for other potential matches) is large, the fit for the potential match may be considered unique.

Thus, in some embodiments, image processor 120 may be configured to determine that a possible (or potential) match is a good fit if the sum of absolute differences between the pixel location of the match within the current block and the corresponding pixel location of the match within a block of the previous image is smaller than a predetermined threshold. Similarly, the image processor may, in some embodiments, be configured to determine that a possible match is a unique fit if the sum of absolute differences (e.g., between the pixel location of the of the match within the current block and the corresponding pixel location of the math within a block of the previous image) is smaller, by a predetermined threshold, than the respective sums of absolute differences for other possible matches. Furthermore, the image processor may be configured to determine the block offset based on the offsets for one or more matches that were each determined to be either a good fit or a unique fit fits, according to some embodiments.

In other words, if there is a position within a block for which a sharp minimum of the sum of absolute differences occurs, that position may represent a unique fit between the two images. If match may be considered unique, that match location may represent a logical reference point between the two images (e.g., may represent the same object or location in the scene being captured).

Figure 6:
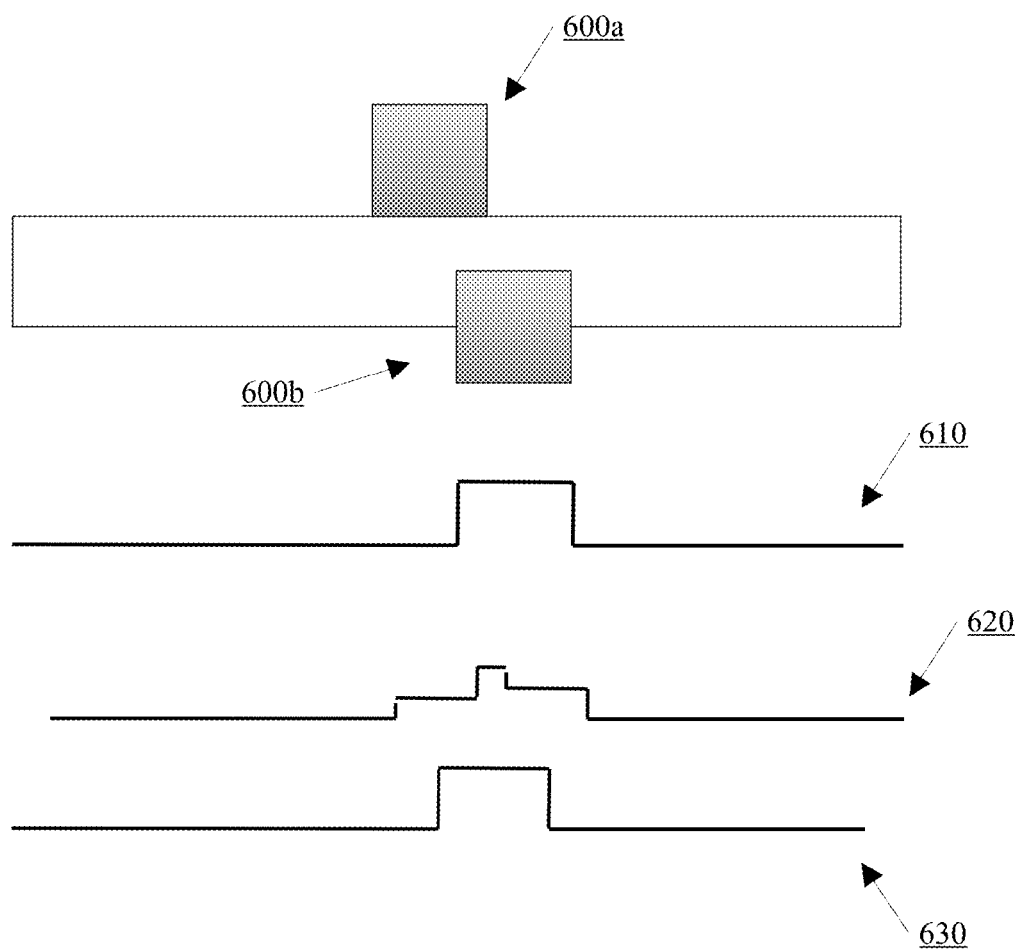
FIG. 6 is a diagram illustrating one embodiment of comparing graphical profiles according to one embodiment of in-stream rolling shutter compensation.

For example, FIG. 6 is a diagram illustrating one embodiment of comparing graphical profiles according to one embodiment of in-stream rolling shutter compensation. Graphical profiles 610 and 630 may represent luminance based graphical profiles to which highpass filters have been applied. According to the example embodiment shown in FIG. 6, graphical profile 610 may correspond to image block 600a while graphical profile 630 may correspond to image block 600b. In one embodiment, the sum of differences may be represented by the line 620 in FIG. 6. As illustrated by the highest point of line 620, a potential match may exist at that location within the relevant image blocks.

When searching for potential matches using graphical profiles as part of in-stream rolling shutter compensation, image processor 120 may not search over a large (or relatively large) area of the image because it may be assumed that the camera is not moving very quickly between image frames. For instance, if it is assumed that the camera is not being moved to intentionally create a pan (e.g., if the camera is being held still), then it may be assumed that the camera will not move much between image frames.

Additionally, in some embodiments, image processor 120 may be configured to use an estimated or predicted location in which to search for potential matches using graphical profiles. In one embodiment, image processor 120 may be configured to use an offset vector recently determined (e.g., for a recently analyzed block and/or strip) to estimate the location of potential matches for the current block/strip. For example, if image processor 120 is currently processing a strip near row 1000 in the overall image and a recently determined offset vector indicates a distance (in terms of dx, dy pixel) of −123, 456 pixels, image processor 120 may begin searching for a potential match for the current block/strip at a location (in the previous image) that is −123, 456 pixels from the strip's location in the current image (e.g., row 1456). Thus, rather than having to search over a large area (or even the entire previous image) for potential matches, image processor 120 may be able to search over a smaller area and therefore load a smaller number of graphical profiles for the previous image, according to some embodiments.

An image processor performing in-stream rolling shutter compensation may then use the luminance profile matches to determine the sub-block motion match in terms of x/y image coordinates. Additionally, multiple matches (e.g., fits) occurring in multiple blocks may be used to determine an aggregate (or average) motion vector for the entire image strip. In some embodiments, it may be assumed that a single strip should have a mostly uniform motion across the entire strip if the perceived motion is cause by camera motion (as opposed to scene motion).

Returning now to FIG. 5, if image processor 120 has finished processing all the blocks for the current strip, as indicated by the positive output from decision block 550, image processor 120 may then combine the individual block offsets into a strip offset vector, as illustrated by block 560. Thus, a motion vector may be derived based on the offsets from one or more match points (in terms of pixel locations) between the two images and may be used to warp the image data to compensate for the determined camera motion. The determined motion vector may include only horizontal and vertical components, without any rotation component, according to some embodiments.

Figure 7:
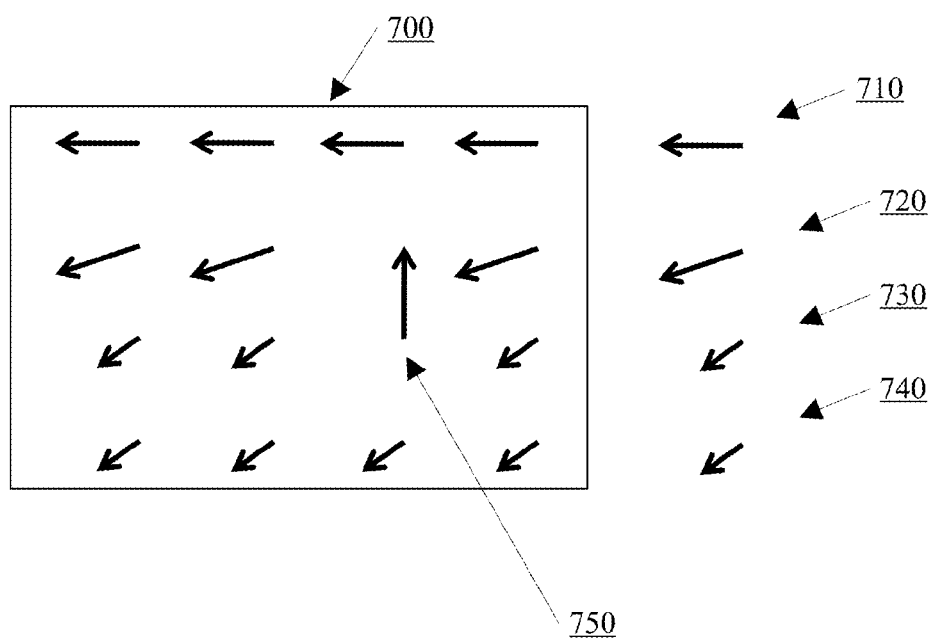
FIG. 7 is a diagram illustrating strip offset vectors according to one embodiment of in-stream rolling shutter compensation.

For example, FIG. 7 is a diagram illustrating strip offset vectors according to one embodiment of in-stream rolling shutter compensation. Diagram 700 illustrates an example set of block offsets (or block vectors) for an example image divided into four strips, according to one embodiment. The example offsets illustrated in diagram 700 are represented as arrows, the direction of which may represent the direction of camera motion and the length of which may represent the magnitude of that motion, according to the example embodiment shown in FIG. 7. Thus, the example camera motion illustrated by diagram 700 may represent a motion that begins going horizontally to the left and gradually (over the course of the frame) become a slower movement diagonally down to the left.

As noted above, image processor 120 may compute a single strip vector based on multiple individual block offsets. In one embodiment, image processor 120 may utilize vector arithmetic to combine the individual block offsets (e.g., as vectors) of a strip to determine a strip motion vector. In some embodiments, the individual block offsets may be averaged together, while in other embodiments, the strip motion vector may be the mean of the individual block offsets. For instance, arrows 710, 720, 730 and 740 may represented the computed strip motion vectors determined for each respective strip and based on the corresponding block offsets illustrated in diagram 700.

Additionally, one or more individual block offsets may be ignored, such as if they represent motion outside of some tolerance of the other block offsets for the strip. For example, in diagram 700 individual block offset 750 may be the result of actual motion in the scene being captured rather than the camera motion causing the other block offsets and therefore block offset 750 may not be considered when computing the strip motion vector for that strip, such as strip vector 730.

If no motion is determined for a strip (e.g., no match, no match considered good enough, or no motion detected for a match), the motion vector for the previous strip may be used to determine a corrective warp applied to the current strip, according to some embodiments. Thus, even if no motion may be detected for the current strip, such as because the relevant portion of the actual scene does not include a "matchable" point, the previous motion vector is continued (while possibly being modified). For instance, if no motion vector is determined for the top-most strip of an image frame, the motion used for the bottom-most strip of the previous frame may be used, in some embodiments.

Returning again to FIG. 5, if, however, there are more blocks to process for the current strip, as indicated by the negative output from decision block 550, image processor 120 may proceed to begin processing the next strip as indicated by the path from the negative output from decision block 550 to block 500.

The following set of example pseudo code illustrates one embodiment of a function implementing in-stream rolling shutter compensation including the computing of a motion vector for a strip.

```
function [warp_vectors, global_vector, block_vectors, old_vector] =
    FindMotionBlocks(Y1,Y2,chunks,strips,max_move,old_vector, vblank)
% Takes two images (Y1 and Y2) with rolling shutter and finds a strip-wise
% estimate of the motion
% It starts with cutting each strip into chunks and it boils the chunks
% down to a global estimate for the motion of the entire strip
% Max move is the size of the search area in pixels (up, down, left and
% right)
% The old vector [x, y, x quality, y quality] is from the bottom strip in the
% previous image. The motion at the end of the last frame is used to start
% the estimate for the top of the next frame
if exist('chunks','var')~=1 chunks=5; end
if exist('strips','var')~=1 strips=8; end
if exist('max_move','var')~=1 max_move=8; end
if exist('old_vector','var')~=1 old_vector=[0 0 0 0]; end
[h,w]=size(Y1);
x_size=(w-(2*max_move))/chunks;
y_size=(h-(2*max_move))/chunks;
vectors=zeros(chunks,strips,2);      % Best motion match, horizontal and vertical
fits=zeros(chunks,strips,2);         % Quality of match in horizontal and vertical
centers=zeros(chunks,strips,2);      % Center of target used for the match
for x=0:(chunks-1)
    for y=0:(strips-1)
        % Center of the blocks. Blocks have an even grid of centers across
        % the image with a border of max_move pixels, to provide support
        % for the motion match.
        xc= ((x+.5)/chunks) * (w-(2*max_move)-1) + max_move+1;
        yc= ((y+.5)/strips) * (h-(2*max_move)-1) + max_move+1;
        block1=Y1( round(((-y_size/2):(y_size/2))+yc),round(((-
        x_size/2):(x_size/2))+xc));
```

```
                block2=Y2( round(((-y_size/2-max_move):(y_size/2+max_move))+yc),round(((-
                x_size/2-max_move):(x_size/2+max_move))+xc));
                % BlockMatch takes two luminance image blocks
                % and it finds the motion vectors
                [vector,fit]=BlockMatch(block1,block2,max_move);
                vectors(y+1,x+1,:)=vector;
                fits(y+1,x+1,:)=fit;
                centers(y+1,x+1,:)=[xc yc];
        end
end
% Sort out the motion vectors by fit quality
% A good fit is better than half median
h_fits=fits(:,:,1);
good_h=median(h_fits(:))/2;
v_fits=fits(:,:,2);
good_v=median(v_fits(:))/2;
good_fits(:,:,1)=h_fits>good_h;
good_fits(:,:,2)=v_fits>good_v;
% Strip vectors have six elements
% x,y,dx,dy,qx,qy
% There is also a strip for the previous frame and for the next frame.
strip_vectors=zeros(size(vectors,1)+2,6);
strip_vectors(1,3:6)=old_vector;
for strip=1:size(fits,1)
        for way=1:2
            good_vectors=vectors(strip,:,way);
            good_vectors=good_vectors(good_fits(strip,:,way));
            if size(good_vectors(:),1)>0
            % If we have at least one good vector, use the median
            v=median(good_vectors(:));
            else
            v=old_vector(way);
            end
            good_count=mean(good_fits(strip,:,way));
            if (good_count<.5 && strip_vectors(strip,way+4)>0)
            % This strip doesn't have enough good motion tracking
            % Just assume constant motion if we have a good previous vector
            v=strip_vectors(strip,way+2);
            end
            strip_vectors(strip+1,way+2)=v; % best guess of motion vector for the
            strip
        end
        strip_vectors(strip+1,1)=size(Y1,2)/2; % Strip center is just the middle
        width of
        image
        strip_vectors(strip+1,2)=centers(strip,1,2); % Center of the strip
        strip_vectors(strip+1,way+4)=good_count;
end
% Fill in the first vector from the old frame.
strip_vectors(1,1)=strip_vectors(2,1);
strip_vectors(1,2)=strip_vectors(end-1,2)-h*(1+vblank); % lines back in time of
the bottom
strip_vectors(end,:)=strip_vectors(end-1,:);
strip_vectors(end,2)=h+1;
old_vector=strip_vectors(end-1,3:6);
% Median or mean? Depends on how confident we are
global_vector=[mean(strip_vectors(:,3)) mean(strip_vectors(:,4))];
warp_vectors=strip_vectors;
% Already filled in. warp_vectors(2:(end-1),5:6)=mean(good_fits,2);
% Some estimate of how believable the vectors are.
block_vectors=strip_vectors;
```

The following set of example pseudo code illustrates one embodiment of a function implementing in-stream rolling shutter compensation including the computing of a motion vector for a strip. The BlockMatch function illustrated below is called by the previous function illustrated in the example source code above.

```
function [motion,fit_quality]=BlockMatch(target, neighborhood, max_move)
    if exist('max_move','var')~=1 max_move=8; end
    % Takes two luminance image blocks and it finds the motion vectors for
    rolling
    % shutter etc.
    % It uses strip-wise row and column sums
    % Input should be top-to-bottom scan order
    % Returns a motion vector dx,dy for the best guess of motion
    % Returns a fit value that indicates the quality of the motion match
    % Low-pass filter
```

```
lp_size=8;
k=normpdf(-lp_size:lp_size,0,lp_size/2);
k=k./sum(k);
% Two blocks, two dimensions, high pass sums. Blocks can be rectangles
% of different sizes.
blocks={target,neighborhood};
blocks_hp={{[ ],[ ]},{[ ],[ ]}};
for b=1:2 % Target and neighborhood
    block=blocks{b};
    for way=1:2 % Horizontal and vertical
        oversize=size(block,way)-size(target,way);
        if way==2
            block=block';
        end
        % Instead of summing the entire support, sum just the overlap
        % part with wings that go out further
        if oversize>0
            strip=block((oversize/2):((oversize/2)+size(target,way)),:);
        else
            strip=block;
        end
        block_sum=sum(strip)';
        % Pad support with copies
        for i=2:size(block_sum,1)
            if isnan(block_sum(i))
                block_sum(i)=block_sum(i-1);
            end
        end
        % Pad support with copies
        for i=(size(block_sum,1)-1):-1:1
            if isnan(block_sum(i))
                block_sum(i)=block_sum(i+1);
            end
        end
        % Support LP with mirror.
        block_low_pass=conv([flipud(block_sum);block_sum;flipud(block_sum)],k,
            'same');
        block_low_pass=block_low_pass((size(block_sum,1)+1):(size(block_sum,1)
            *2));
        block_high_pass=block_sum-block_low_pass;
        blocks_hp{b}{way}=block_high_pass;
    end
end
motion=[0,0];
fit_quality=[0,0];
% Horizontal then vertical match
for way=1:2
    target_profile=blocks_hp{1}{way};
    neighborhood_profile=blocks_hp{2}{way};
    %fit=conv(neighborhood_profile,flipud(target_profile),'valid');
    fit=SlidingSAD(target_profile,neighborhood_profile);
    center=round(size(fit,1)/2);
    area_of_interest=fit((center-max_move):(center+max_move),:);
    [peak_height,peak]=min(area_of_interest);
    motion(way) = peak - round(size(area_of_interest,1)/2);
    % A test of fit uniqueness.
    fit_min=max(peak-round(size(area_of_interest,1)/10),1);
    fit_max=min(peak+round(size(area_of_interest,1)/10),size(area_of_interest,
    1));
    other_fits=area_of_interest([1:fit_min fit_max:end]);
    fit_quality(way)=min(other_fits)-peak_height;
end
```

While the above example code snippets uses particular function, method and variable names, other embodiments may utilize different functions, methods and/or variables and may perform the same, more or fewer functions when implementing in-stream rolling shutter compensation, as described herein.

Figure 8:
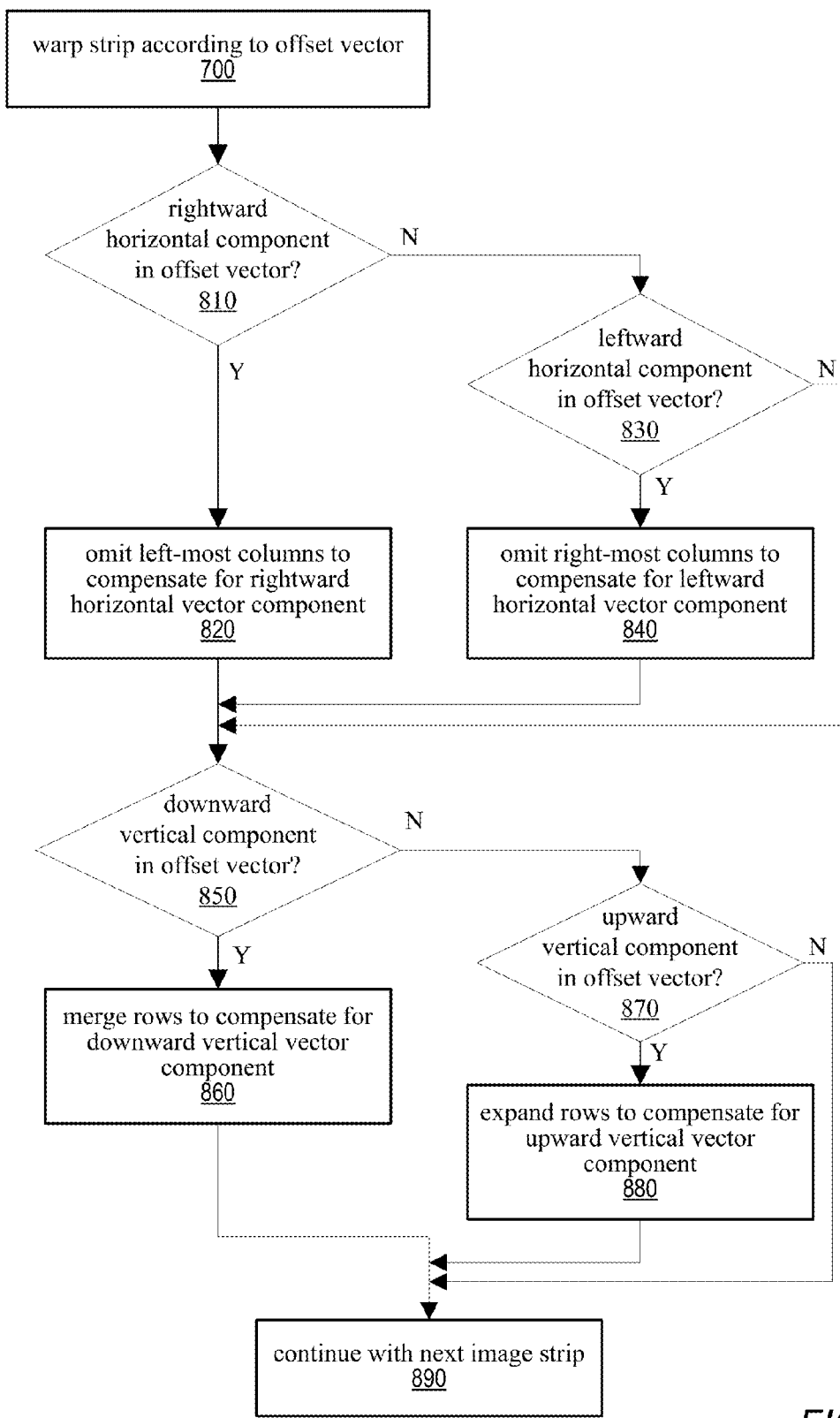
FIG. 8 is a flowchart illustrating one embodiment of a method for warping an image strip according to in-stream rolling shutter compensation.

FIG. 8 is a flowchart illustrating one embodiment of a method for warping an image strip according to in-stream rolling shutter compensation. As noted previously image processor 120 may perform a warp on the image data for an individual image strip to compensate for the determined camera motion. Thus, image processor 120 may begin to warp the strip according to the determined offset vector according to one embodiment, as shown in block 800.

The exact nature of the warp may be determined based on the motion vector determined for the strip. Such a warp may be performed when writing the image data out to memory (or another component of the digital camera). Image processor 120 may warp the image data for the current strip as that image data is written out to memory and before beginning the analysis of the next image strip, according to some embodiments. The warp may include stretching or shearing of the image (in both the vertical and horizontal directions), according to some embodiments. The corrective (e.g., compensative) warp may be considered separable, according to some embodiments. That is, each line in the image data, may be shifted to the right or left horizontally and may also be stretched or compressed vertically.

The corrective (e.g., compensative) warp may include a horizontal shift of the image data within the strip, such as by skipping a number of pixels at one end of each line in the strip while padding the other end of the line (e.g., with zeros). For instance, if there is a rightward horizontal component in the offset vector, as indicated by the positive output from decision block 810, then image processor 120 may omit one or more left-most columns from the strip to compensate for the rightward horizontal vector component, as shown in block 820. Alternatively, if there is a leftward horizontal component in the offset vector, as indicated by the positive output from decision block 830, image processor 120 may omit one or more right-most columns to compensate for the leftward horizontal vector component, as illustrated by block 840.

The warp may also include a vertical stretch or compression to compensate for perceived vertical motion. In one embodiment, the image may be stretched vertically by writing a line multiple times while lines may be skipped in order to compress the image vertically. For instance, if there is a downward vertical component in the offset vector, as indicated by the positive output from decision block 850, image processor 120 may combine or merge two or more rows in the strip to compensate for the downward vertical vector component, as shown in block 860. Alternatively, if there is an upward vertical component in the offset vector, as indicated by the positive output of decision block 870, image processor 120 may expand, duplicate, or resample one or more rows to compensate for the upward vertical vector component, as shown in block 880.

Thus, image processor 120 may be configured to output additional or fewer rows of image data that being received for a particular strip to compensate for detected camera motion. Image processor 120 may combine or merge multiple rows in any of various manners, according to different embodiments. For example, in one embodiment, image processor 120 may be configured to average or interpolate the image data of the rows in order to combine or merge two or more rows. In another example, image processor 120 may resample one or more rows of image data to obtain fewer rows as a way of combining or merging the rows. Image processor 120 may also resample one or more rows to output additional rows. In general any suitable method for combining, merging, expanding duplicating, and/or resampling the image data may be used to warp (or otherwise modify) image data rows to compensate for detected camera motion, according to some embodiments.

Thus, image processor 120 may perform vertical stretching or compression by generating fewer or additional lines of image data than in the original (e.g., as received from the camera image sensor). Additionally, image processor 120 may be configured to adjust the data and write it out faster than it is received, according to some embodiments. Therefore, in some embodiments, image processor 120 may be configured to perform in-stream rolling shutter compensation quickly enough to be done as the image data is received from the camera image sensor (e.g., in real-time or near real-time).

In general, whatever motion was determined (and represented by computed motion vectors) may be compensated for as the image data is written out, according to some embodiments. In some embodiments, no rotation compensation may be applied when warping the image data to compensate for detected camera motion. Image processor 120 may then continue processing the image by starting on the next image strip, as illustrated by block 890.

Please note that while described as separate functions or steps for ease of discussion, the warping of a line of image data may be performed in such a way as to incorporate both a vertical and a horizontal compensation. For instance, in one embodiment, if the computed motion vector for a strip includes both a horizontal component and a vertical component, a warp may be applied to compensate for both motion components. Thus, a line of image data may be duplicated, such as to compensate for a vertical vector component, and may also have one or more pixels omitted from one line end, such as to compensate for a horizontal vector component, according to one embodiment.

When performing in-stream rolling shutter compensation, one or more constraints may be used to limit the amount of motion compensation and may vary from one strip to the next. For example, a damping factor may be applied to help ensure that the corrective warp is smooth (e.g., no abrupt camera motion may be apparent).

In general, only a small number of line buffers may be needed to perform in-stream rolling shutter compensation. In one embodiment, the number of line buffers may be equal to the number of columns in the strip plus one extra (e.g., for combining two lines—one in the strip and one adjacent to the strip). For example, if a strip is 8 lines high (in terms of pixels) 9 line buffers may be used when perform in-stream rolling shutter compensation, as described herein.

According to some embodiments, in-stream rolling shutter compensation may be performed while the image is being captured (e.g., in real-time or near real-time) rather than as a post-processing step (e.g., after the image data has been saved to system memory). However, the methods and/or techniques for in-stream rolling shutter compensation described herein may apply to, and be used during, post-processing of an image.

The techniques described herein regarding in-stream rolling shutter compensation do not utilize gyroscopic data from camera hardware that includes a gyroscope. According to some embodiments, just the image data alone is used to determine the camera motion. In general, use of gyroscopic data may be too slow for use when in-stream rolling shutter compensation, but in some embodiments gyroscopic data could be used to verify that the determined motion (e.g., which is being compensated for) is actually camera motion and not scene motion. For example, in one embodiment, image processor 120 may be configured to check gyroscopic data after processing multiple image frames using in-stream rolling shutter compensation. If the motion is determined to not be actual camera motion according to the gyroscopic data, image processor 120 may be configured to stop performing in-stream rolling shutter compensation.

Additionally, the techniques described herein for in-stream rolling shutter compensation may, in some embodiments, be considered a fall back mode to hardware based Graphical Processing Unit (GPU) motion correction. Alternatively, image processor 120 may be configured to activate a GPU to reprocess frames if checking the gyroscopic data determines that scene motion was incorrectly detected as camera motion.

Figure 9:
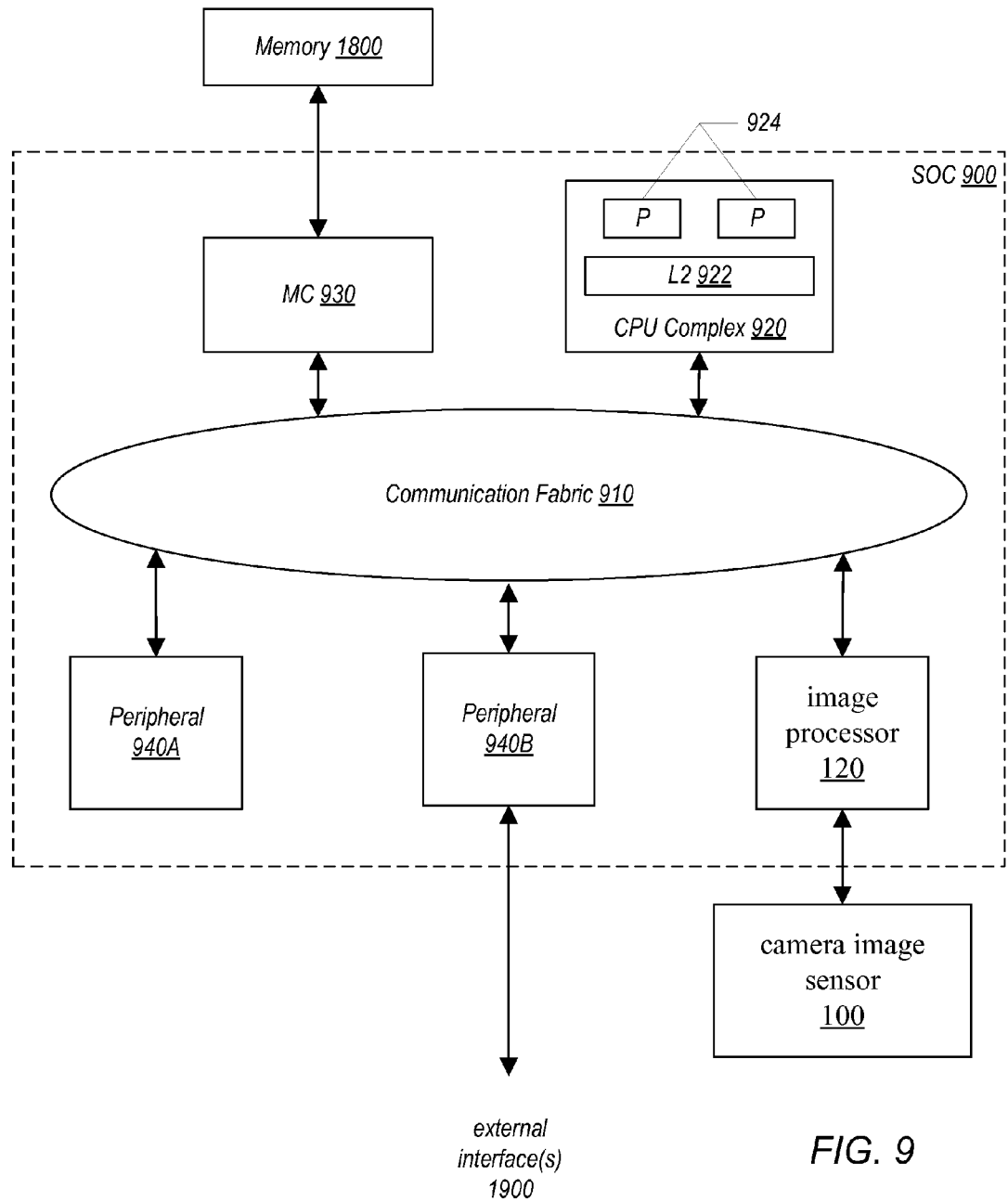
FIG. 9 is a logical block diagram illustrating a computing device capable of implementing in-stream rolling shutter compensation, as described herein.

The techniques described herein for in-stream rolling shutter compensation may be implemented on any of a wide variety of computing devices. Turning now to FIG. 9, which illustrates one embodiment of system configured to implement in-stream rolling shutter compensation, as described herein. In general, the computer system illustrated in FIG. 9 may be any of various types of computing device, including, but not limited to, a personal computer system, desktop computer, laptop or notebook computer, mainframe computer system, handheld computing device, cellular phone, smartphone, mobile phone, workstation, network computer, a consumer device, application server, storage device, intelligent display, a peripheral device such as a switch, modem, router, etc., or in general any type of computing device. According to one example embodiment, the system illustrated in FIG. 9 may represent a system-on-a-chip (SOC). As implied by the name, the components of the SOC 900 may be integrated onto a single semiconductor substrate as an integrated circuit "chip." In some embodiments, the components may be implemented on two or more discrete chips in a system. The SOC 900 will be used as an example herein.

In the illustrated embodiment, the components of the SOC 900 include a central processing unit (CPU) complex 920, on-chip peripheral components 940A-940B (more briefly, "peripherals"), a memory controller (MC) 930, a communication fabric 910, and an image processor 120 (which may itself be considered a peripheral component). SOC 900 may also be coupled to additional components, such as to memory 1800 and camera image sensor 100. The components 920, 930, 940A-940B, and 120 may all be coupled to the communication fabric 910. The memory controller 930 may be coupled to the memory 1800 during use, and the peripheral 940B may be coupled to an external interface 1900 during use. Additionally, image processor 120 may be coupled to camera image sensor 100 during use. In the illustrated embodiment, the CPU complex 920 includes one or more processors 924 and a level two (L2) cache 922.

The peripherals 940A-940B may be any set of additional hardware functionality included in the SOC 900. For example, the peripherals 940A-940B may include display controllers configured to display video data on one or more display devices, graphics processing units (GPUs), video encoder/decoders, scalers, rotators, blenders, etc. Image processor 120 may, in some embodiments, be part of another video peripheral such as an image signal processor configured to process image capture data from camera image sensor 100 (or other image sensor). The peripherals may also include audio peripherals such as microphones, speakers, interfaces to microphones and speakers, audio processors, digital signal processors, mixers, etc. The peripherals may include peripheral interface controllers for various interfaces 1900 external to the SOC 900 (e.g. the peripheral 940B) including interfaces such as Universal Serial Bus (USB), peripheral component interconnect (PCI) including PCI Express (PCIe), serial and parallel ports, etc. The peripherals may further include networking peripherals such as media access controllers (MACs). In general, any set of hardware may be included, according to various embodiments.

More particularly in FIG. 9, SOC 900 may include at least one instance of an image processor component, for example image processor 120 that may be configured to implement in-stream rolling shutter compensation, as described herein.

The CPU complex 920 may include one or more CPU processors 924 that serve as the CPU of the SOC 900. The CPU of the system may include the processor(s) that execute the main control software of the system, such as an operating system. Generally, software executed by the CPU during use may control the other components of the system to realize the desired functionality of the system. The processors 924 may also execute other software, such as application programs. The application programs may provide user functionality, and may rely on the operating system for lower level device control. Accordingly, the processors 924 may also be referred to as application processors. The CPU complex 920 may further include other hardware such as the L2 cache 922 and/or and interface to the other components of the system (e.g. an interface to the communication fabric 910).

Generally, a processor may include any circuitry and/or microcode configured to execute instructions defined in an instruction set architecture implemented by the processor. The instructions and data operated on by the processors in response to executing the instructions may generally be stored in the memory 1800, although certain instructions may be defined for direct processor access to peripherals as well. Processors may encompass processor cores implemented on an integrated circuit with other components as a system on a chip (SOC 900) or other levels of integration. Processors may further encompass discrete microprocessors, processor cores and/or microprocessors integrated into multichip module implementations, processors implemented as multiple integrated circuits, etc.

The memory controller 930 may generally include the circuitry for receiving memory operations from the other components of the SOC 900 and for accessing the memory 1800 to complete the memory operations. The memory controller 930 may be configured to access any type of memory 1800. For example, the memory 1800 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 930 may include queues for memory operations, for ordering (and potentially reordering) the operations and presenting the operations to the memory 1800. The memory controller 930 may further include data buffers to store write data awaiting write to memory and read data awaiting return to the source of the memory operation. In some embodiments, the memory controller 930 may include a memory cache to store recently accessed memory data. In SOC implementations, for example, the memory cache may reduce power consumption in the SOC by avoiding reaccess of data from the memory 1800 if it is expected to be accessed again soon. In some cases, the memory cache may also be referred to as a system cache, as opposed to private caches such as the L2 cache 922 or caches in the processors 924, which serve only certain components. Additionally, in some embodiments, a system cache need not be located within the memory controller 930.

In an embodiment, the memory 1800 may be packaged with the SOC 900 in a chip-on-chip or package-on-package configuration. A multichip module configuration of the SOC 900 and the memory 1800 may be used as well. Such configurations may be relatively more secure (in terms of data observability) than transmissions to other components in the system (e.g. to the end points 16A-16B). Accordingly, protected data may reside in the memory 1800 unencrypted, whereas the protected data may be encrypted for exchange between the SOC 900 and external endpoints.

The communication fabric 910 may be any communication interconnect and protocol for communicating among the components of the SOC 900. The communication fabric 910 may be bus-based, including shared bus configurations, cross bar configurations, and hierarchical buses with bridges. The communication fabric 910 may also be packet-based, and may be hierarchical with bridges, cross bar, point-to-point, or other interconnects.

It is noted that the number of components of the SOC 900 (and the number of subcomponents for those shown in FIG. 9, such as within the CPU complex 920) may vary from embodiment to embodiment. There may be more or fewer of each component/subcomponent than the number shown in FIG. 9.

In some embodiments, the methods described herein may be implemented by a computer program product, or software. In some embodiments a non-transitory, computer-readable storage medium may have stored thereon instructions which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 900 may include a processor unit 920 (possibly including multiple processors, a single-threaded processor, a multi-threaded processor, a multi-core processor, etc.) which may be configured to execute one or more modules, such as image processor 120, which may be present within program instructions stored in memory 1800 of the same computer system or may be present within program instructions stored within a memory of another computer system similar to or different from computer system 900. In some embodiments, the various components configured to implement in-stream rolling shutter compensation may be part of different computer systems working together.

System memory 1800 may include program instructions configured to implement some or all of the techniques described herein for in-stream rolling shutter compensation (according to any of the embodiments described herein). For example, memory 1800 may include code to implement and/or execute any or all of the components of image processor 120.

In various embodiments, image processor 120, and/or individual sub-modules of image processor 120 may each be implemented in any of various programming languages. For example, in one embodiment, image processor 120 may be JAVA based, while in another embodiment, image processor 120 may be written using the C or C++ or assembly programming languages. Moreover, in some embodiments, different portions or sub-modules of image processor 120 may be implemented using different programming languages.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
  performing, by an image processor:
    while receiving an image:
      receiving image data for a strip of the image, wherein the strip comprises image data for a plurality of pixel rows of the image, wherein the plurality of pixel rows comprise less than a total number of pixel rows in the image;
      for each of a plurality of blocks across the strip:
        determining a graphical profile for the given block, comprising combining information regarding one or more pixels of the given block;
        determining an offset for the given block based on comparing the determined graphical profiles with graphical profiles for a previous image;
      determining a motion vector for the strip based on the determined offsets for the plurality of blocks; and
      adjusting said image data for the strip, according to the determined motion vector, wherein the image data for the strip is adjusted prior to receiving image data for a subsequent strip in the image.

2. The method of claim 1, wherein said determining a graphical profile comprises:
  summing graphical values for a plurality of pixels in each row of the block; and
  summing graphical values for a plurality of pixels in each column of the block.

3. The method of claim 2, wherein the graphical values comprise luminance values for the plurality of pixels.

4. The method of claim 1, wherein said determining a graphical profile comprises:
  averaging graphical values for a plurality of pixels in each row of the block; and
  averaging graphical values for a plurality of pixels in each column of the block.

5. The method of claim 1, wherein said determining an offset comprises one or both of:
  determining a horizontal offset for the given block based on comparing a horizontal component of the graphical profile to graphical profiles for one or more other blocks of the previous image; and
  determining a vertical offset for the given block based on comparing a vertical component of the graphical profile to graphical profiles for the one or more other blocks of the previous image.

6. The method of claim 1, wherein said determining an offset comprises comparing multiple possible matches between the graphical profile for the given block and the graphical profiles for the previous image.

7. The method of claim 6, wherein said comparing among multiple possible matches comprises comparing, for each possible match, a sum of absolute differences between graphical profiles for a pixel location within the given block and graphical profiles for a location within one of the blocks of the previous image.

8. The method of claim 7, wherein said comparing among multiple possible matches further comprises:
determining that a given possible match is a good fit if the sum of absolute differences between the pixel location within the given block and the pixel location within the one of the blocks of the previous image is smaller than a predetermined threshold; and
determining that a given possible match is a unique fit if the sum of absolute differences between the pixel location within the given block and the pixel location within the one of the blocks of the previous image is smaller, by a predetermined threshold, than respective sums of absolute differences for others of the multiple possible matches.

9. The method of claim 6, wherein the determined offset for the given block is based on offsets for one or more of the possible matches that were determined to be one or both of: a good fit or a unique fit.

10. The method of claim 1, wherein the graphical profile for the given block comprises luminance data for the given block.

11. The method of claim 1, wherein said determining a motion vector for the strip comprises combining the respective offsets for one or more of the blocks of the strip.

12. The method of claim 1, wherein said adjusting comprises omitting one or more columns of pixels from the image data to compensate for a horizontal component of the motion vector.

13. The method of claim 1, wherein said adjusting comprises combining one or more rows of pixels in the image data to compensate for a vertical component of the motion vector.

14. The method of claim 1, wherein said adjusting comprises duplicating or resampling one or more rows of pixels in the image data to compensate for a vertical component of the motion vector.

15. A system, comprising:
a camera image sensor;
an image processing unit configured to:
while receiving image data for an image from a camera image sensor:
accumulate a strip of said image data comprising a plurality of pixel rows, wherein the plurality of pixel rows comprise less than a total number of pixels rows in the image;
determine a motion vector representing effects from motion of the camera image sensor; and
adjust the image data for the strip to compensate for the determined motion vector, wherein the image data of the strip is adjusted prior to receiving image data for a subsequent strip in the image.

16. The system of claim 15, wherein the image processing unit is further configured to:
divide the strip into a plurality of blocks; and
for each of the plurality of blocks:
convert RGB data for the pixels of the given block into luminance data;
combine the luminance data by rows into a horizontal luminance profile for the given block;
determine a horizontal movement offset for the given block based on comparing block's the horizontal luminance profile to horizontal luminance profiles for a previous image;
combine the luminance data by columns into a vertical luminance profile for the given block;
determine a vertical movement offset for the given block based on comparing block's the vertical luminance profile to vertical luminance profiles for a previous image; and
determine the offset vector based on one or more of the determined movement offsets.

17. The system of claim 15,
wherein to determine said motion vector, the image processing unit is further configured to determine an overall movement vector for the strip based on combining one or more horizontal and vertical movement offsets for the plurality of blocks; and
wherein to adjust the image data for the strip, the image processing unit is further configured to adjust the image data for the strip to compensate for the determined overall movement vector.

18. A method for compensating for rolling shutter motion, comprising:
receiving image data for each of a plurality of image strips of an image;
determining a motion vector for each of the plurality of image strips based on comparing block movement offsets for each of a plurality of blocks in a given strip to offset data for a previous image; and
warping said image data for each of the plurality of strips based on the determined motion vectors, wherein the image data for a first image strip is warped prior to receiving the image data for a subsequent image strip of the image.

19. The method of claim 18, wherein said comparing block movement offsets comprises:
computing a luminance profile for each of the plurality of blocks in the given image strip; and
comparing the luminance profile to luminance data for the previous image.

20. The method of claim 18, further comprising:
receiving, from a camera image sensor, the image data for each of the plurality of image strips in turn; and
determining the motion vector for the first image strip prior to receiving the image data for the subsequent image strip.

* * * * *